(12) United States Patent
Palmeri

(10) Patent No.: US 10,055,952 B2
(45) Date of Patent: Aug. 21, 2018

(54) CONDUCTING AND GUIDING INDIVIDUALS SAFELY

(71) Applicant: Richard Palmeri, North Palm Beach, FL (US)

(72) Inventor: Richard Palmeri, North Palm Beach, FL (US)

(*) Notice: Subject to any disclaimer, the term of this patent is extended or adjusted under 35 U.S.C. 154(b) by 0 days.

(21) Appl. No.: 15/586,918

(22) Filed: May 4, 2017

(65) Prior Publication Data

US 2017/0236391 A1 Aug. 17, 2017

Related U.S. Application Data

(63) Continuation of application No. 14/776,279, filed as application No. PCT/US2014/026184 on Mar. 13, 2014, now Pat. No. 9,685,053.

(60) Provisional application No. 61/782,581, filed on Mar. 14, 2013.

(51) Int. Cl.
*G08G 1/095* (2006.01)
*G08B 7/06* (2006.01)

(52) U.S. Cl.
CPC .................. *G08B 7/066* (2013.01)

(58) Field of Classification Search
CPC .................. G08B 1/00; G06F 1/00
See application file for complete search history.

(56) References Cited

U.S. PATENT DOCUMENTS

| | | | |
|---|---|---|---|
| 2004/0036579 A1* | 2/2004 | Megerle | G08B 7/066 340/332 |
| 2005/0270175 A1 | 12/2005 | Peddie et al. | |
| 2008/0084296 A1 | 4/2008 | Kutzik et al. | |
| 2012/0218301 A1 | 8/2012 | Miller | |
| 2012/0230696 A1 | 9/2012 | Pederson et al. | |
| 2013/0183924 A1* | 7/2013 | Saigh | H04W 4/025 455/404.2 |
| 2013/0201025 A1* | 8/2013 | Kamalakannan | H04N 7/185 340/632 |
| 2016/0035194 A1 | 2/2016 | Palmeri | |

FOREIGN PATENT DOCUMENTS

WO    WO2014160259    10/2014

* cited by examiner

*Primary Examiner* — Shirley Lu
(74) *Attorney, Agent, or Firm* — McHale & Slavin, P.A.

(57) ABSTRACT

Systems and methods are provided which utilize data collection to determine whether an event requiring routing of individuals through a structure has occurred and thereafter controlling the operation of guidance devices to conduct and guide individuals safely through and out of the structure.

16 Claims, 5 Drawing Sheets

200

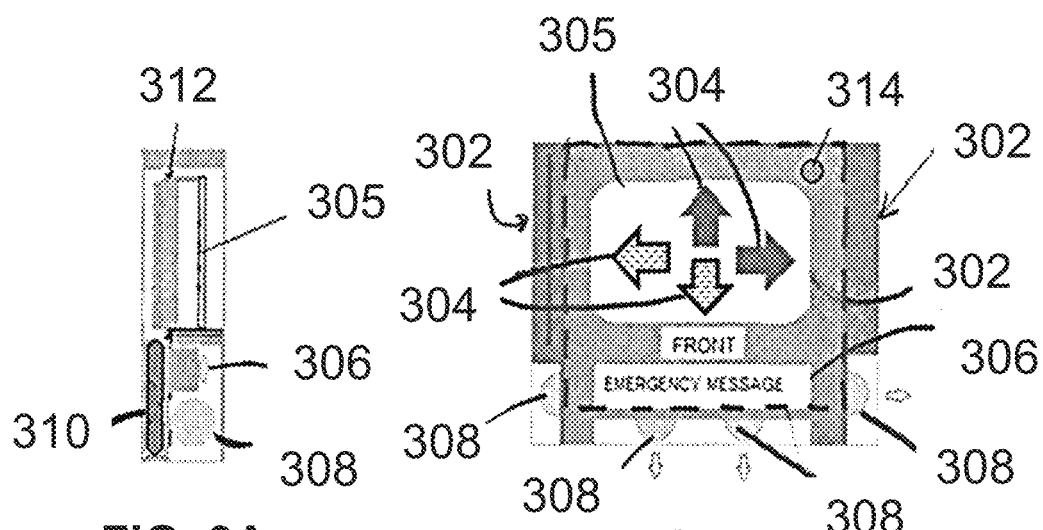
FIG. 3A
220
FIG. 3B
220
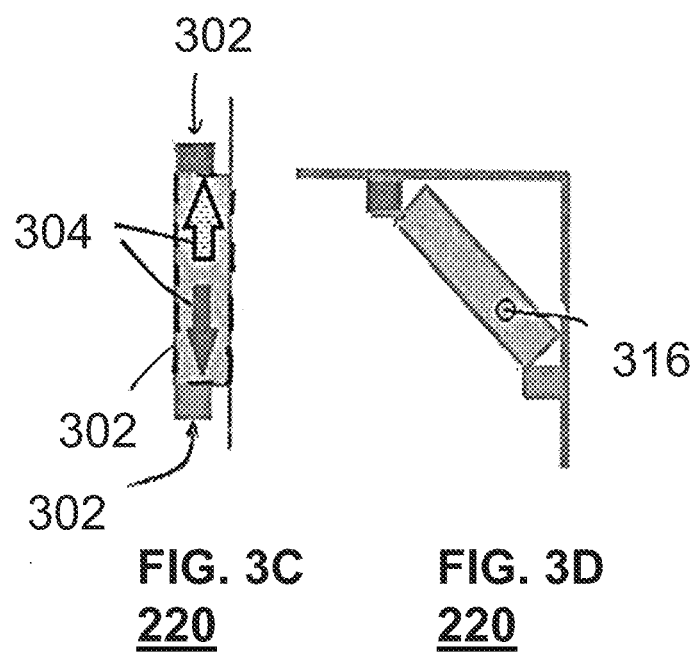
FIG. 3C
220
FIG. 3D
220

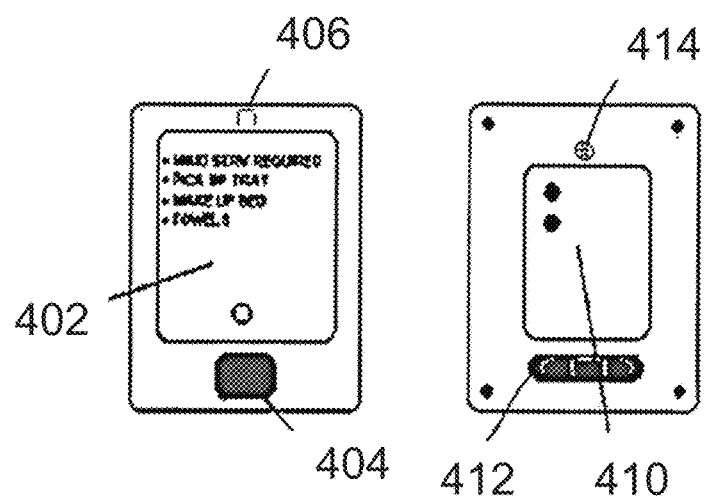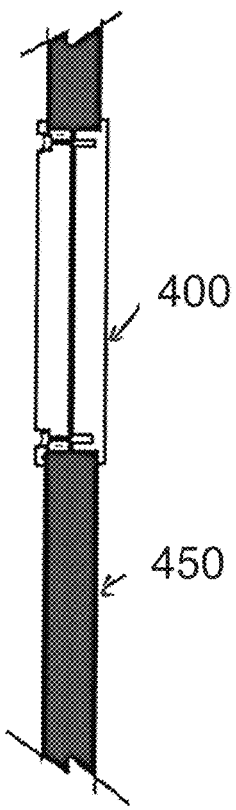
FIG. 4A
400
FIG. 4B
400
FIG. 4C

500

550

CONDUCTING AND GUIDING INDIVIDUALS SAFELY

REFERENCE TO RELATED APPLICATIONS

In accordance with 37 C.F.R. § 1.76, a claim of priority is included in an Application Data Sheet filed concurrently herewith. Accordingly, the present invention claims priority as a continuation of U.S. patent application Ser. No. 14/776,279, filed on Sep. 14, 2015, entitled "CONDUCTING AND GUIDING INDIVIDUALS SAFELY", which is a national stage filing in accordance with 35 U.S.C. § 371 of PCT/US2014/026184, filed Mar. 13, 2014, entitled "CONDUCTING AND GUIDING INDIVIDUALS SAFELY", which claims the benefit of the priority of U.S. Provisional Patent Application No. 61/782,581, filed Mar. 14, 2013, entitled "SAFE PATH", the contents of all applications are herein incorporated by reference in their entirety.

FIELD OF THE INVENTION

The present invention relates the conducting and guiding of individuals, and in particular to apparatus and methods for conducting and guiding individuals safely.

BACKGROUND OF THE INVENTION

A significant problem faced by hospitality services, entertainment services, and education services is how to conduct and guide individuals through and out of structures, especially in emergency situations. The most common method of conducting individuals consists of the placement of illuminated "EXIT" signs throughout a structure to guide individuals to standard means of egress from the structure, such stairwells, ramps, and emergency exit doors. However, in the case that the standard means of egress are blocked, malfunctioning, or otherwise unavailable, there is typically no practical method of conducting and guiding individuals to alternate means of egress other than sending personnel to intercept individuals and redirect them to available means of egress or making an announcement over a loudspeaker system. Unfortunately, by the time an operator of the structure becomes aware of an issue and can take action, injury or loss of life could occur. This type of system does not take into account that events in a disaster change. Therefore, what is needed is a system that is dynamic and therefore changes as the circumstances change.

SUMMARY OF THE INVENTION

Embodiments of the invention concern systems and methods for guiding individuals through a structure. In a first embodiment of the invention, there is provided a system for guiding individuals through a structure. The system includes at least one data collection device for generating collected data regarding conditions within one or more portions of the structure. The system also includes a plurality of guidance devices positioned throughout the structure and processing logic. The processing logic configured for performing operations including receiving the collected data from the at least one data collection device, determining a current status of at least a portion of the structure based at least on the received data, and configuring at least a portion of the plurality of guidance devices to direct an individual through the structure, where the configuration for each of the portion of the plurality of guidance devices is selected based on the current status.

In the system, the processing logic can be further configured for receiving additional data from the at least one data collection device, updating a current status of at least a portion of the structure based at least on the additional data to yield an updated status, and updating a configuration of at least the portion of the plurality of guidance devices based on the updated status.

In the system, the at least one data collection device can be a sensor device. The sensor device can be at least one of an audio monitoring device, a video monitoring device, a motion detection device, an environment monitoring device, a smoke detector device, a biological hazard detection device, a chemical hazard detection device, and a radiological hazard detection device. When the at least one data collection device includes at least one of an audio monitoring device and a video monitoring device for generating at least one of audio or video data as the collected data, the processing logic can be configured for determining the current status by audibly or visually recognizing an event or condition within the structure from the collected data.

In the system, each of the plurality of guidance devices can be at least one of a lighting device or an informational display device.

In a second embodiment of the invention, there is provided another system for guiding individuals through a structure. The system can include a plurality of sensor devices positioned through the structure and configured for generating sensor data for at least a portion of the structure. The system can also include a plurality of guidance devices positioned through the structure and configured for displaying at least directional information to individuals, the directional information indicating a best case through use of situational data to indicate direction of egress, the direction of egress comprising one of a horizontal direction or a vertical direction. The system can further include a processor and a computer-readable medium having stored thereon a plurality of instructions for causing the processor to perform operations including: receiving the sensor data, determining a current status of at least a portion of the structure based at least based on at least one single data input on the sensor data, and configuring at least a portion of the plurality of guidance devices to each indicate at least one of the vertical direction and the horizontal direction, where the at least one of the vertical direction and the horizontal direction for each of the portion of the plurality of guidance devices is selected based on the current status. This for example takes into consideration the current status or condition of stair wells and or elevations In the system, at least a portion of the plurality of sensor devices can be integrated into one or more of the plurality of guidance devices. Further, each of the plurality of sensor devices can be at least one of an audio monitoring device, a video monitoring device, an environment monitoring device, a smoke detector device, a biological hazard detection device, a chemical hazard detection device, and a radiological hazard detection device. When the at least one data collection device includes at least one of an audio monitoring device and a video monitoring device for generating at least one of audio or video data as the collected data, the processing logic can be configured for determining the current status by audibly or visually recognizing an event or condition within the structure from the collected data.

The system can be further designed to communicate directly with smart phones and or other devices in order to create an additional means of communication between the system and individuals in the building as well as first responders the system and people in the building including other responders.

In the system, at least a portion of the plurality of guidance devices can include downward pointing lighting for providing floor illumination. Further, at least a portion of the plurality of guidance devices can include a front surface, at least one side surface, and a top surface, where the front surface and at least one of the top surface or at least one side surface are configured for displaying the directional information. Additionally, the displaying of the direction information includes displaying one or more arrows corresponding to the direction of egress based on the current status. The directional information can be displayed using dedicated display devices or using reconfigurable display devices.

In a third embodiment of the invention, there is provided a system for guiding individuals through a structure. The system includes at least one motion detector associated with at least a first location in the structure, one or more lighting devices for at least partially illuminating a path through the structure between the first location and a second location, and processing logic. The processing logic is configured for performing operations including: receiving a signal from the at least one motion detector, determining, based on the received signal, whether an individual is located at the first location, and upon determining an individual is located at the first location, causing the lighting devices to be activated. The communication can be through any number of means and technologies including RF, Bluetooth, Z wave, hardwire, etc.

In the system, the processing logic can be further configured for receiving an additional signal from the at least one motion detector, determining, based on the additional signal, whether an individual has returned to the first location from the second location, and upon determining an individual has returned to the first location, causing the lighting devices to be deactivated.

In the system, the lighting devices are configured for illuminating at least a first area in proximity of the first location and a second area in proximity of the second location. Further, the first location can be a bedside location and the second location can be a restroom location.

BRIEF DESCRIPTION OF THE FIGURES

FIGS. 3A, 3B, and 3C show various views of a guidance device in accordance with the various embodiments;

FIG. 3D, shows an alternate configuration for the guidance device of FIGS. 3A-3C;

FIGS. 4A, 4B, and 4C show various views of a bifacial information panel that could be used as guidance device in accordance with the various embodiments.

DETAILED DESCRIPTION OF THE INVENTION

Figure 1:
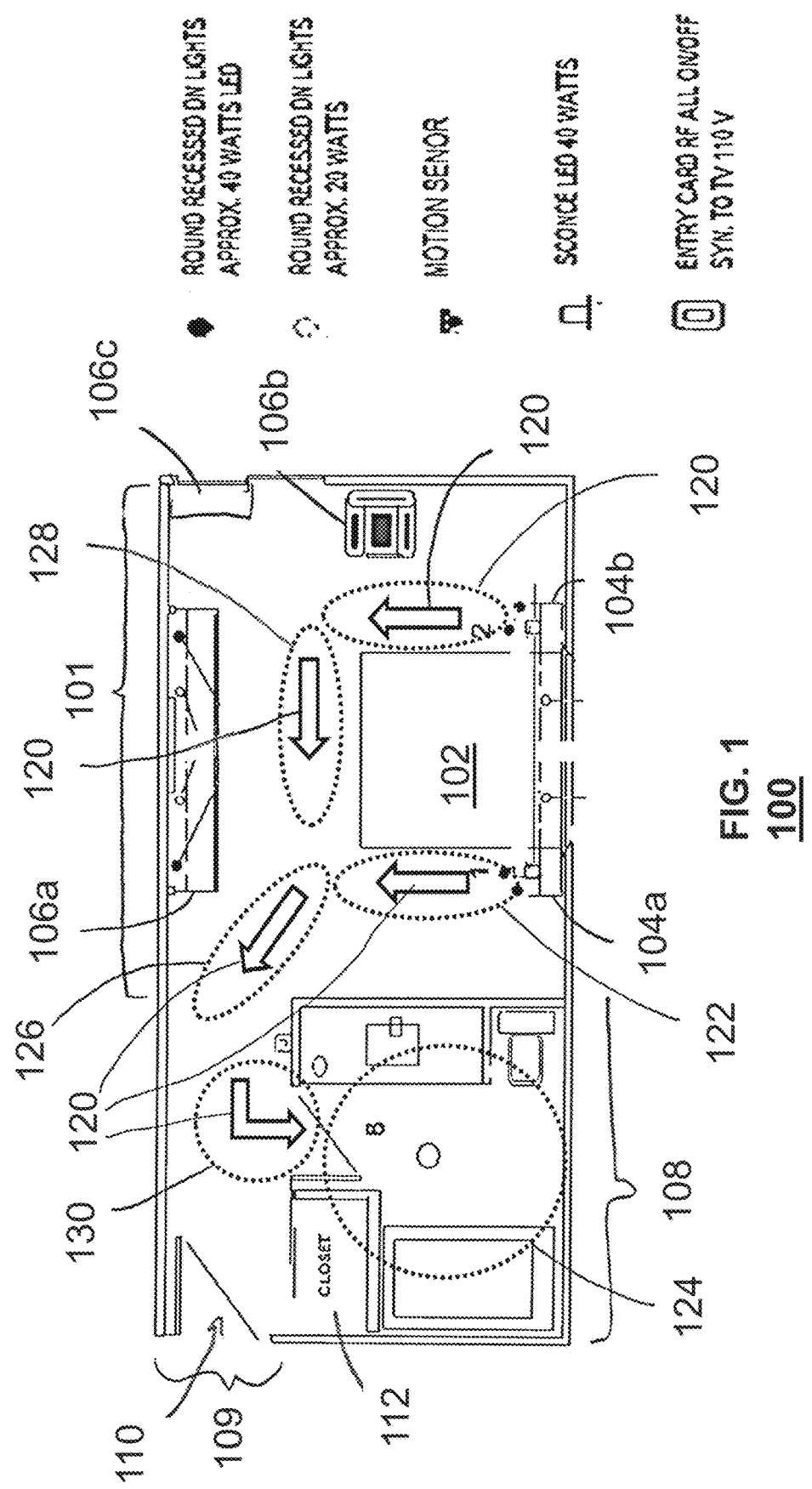
FIG. 1 shows a schematic illustrating one exemplary configuration for conducting and guiding individuals safely in accordance with the various embodiments.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As noted above, a major limitation of existing systems and methods for conducting and guiding individuals safely is that such systems and methods are generally static. For example, signage associated with such systems and methods is typically fixed. Further, another limitation of such systems and methods is that they are designed to directed persons to the "default" means of egress for a structure. For example, in a building, signage is designed to direct individuals to stairwells and emergency exists.

However, in certain circumstances, the user of such "default" means of egress may be impossible or undesirable. For example, if a fire spreads to a stairwell of a building, the stairwell may become unusable. Unfortunately, individuals would still be guided to such stairwell, only to find themselves heading towards the fire instead of away from the fire. In another example, if a gunman enters a structure, there is no way to safely inform individuals on how to exit the structure safely to avoid the gunman.

The various embodiments of the invention address such issues by providing systems and methods for conducting individuals safely. In particular, the various embodiments are directed to systems and methods which utilize data collection to control the operation of guidance devices to conduct and guide individuals through a structure safely. The term "structure", as used herein, refers not only to any relatively permanent construction such as a building (public, private, residential), but also includes any temporary or mobile structures, on land, sea, or air, such as, but not limited to, temporary or portable buildings, aircraft, or watercraft (whether surface-based or submerged). The present disclosure also contemplates that a "structure" also refers to adjoining or related areas and regions. For example, parking lots, parks, undeveloped or natural areas, playgrounds, or any other features adjacent or connected to a construction can be considered part of the "structure".

In some embodiments, the systems and methods of the various embodiments can be utilized to provide simple guidance through an area of a structure. One example, is the case of a hotel room. In such a scenario, when persons awake in the middle of the night, they may be disoriented due to the strange surroundings and may have difficulty locating, for example, the restroom. One option is for the person to turn on lights. However, this may result in the person having difficulty going back to sleep. Further, if the person is sharing the room with another, turning on lights may disturb the other person. Accordingly, the various embodiments of the invention can be leveraged to manage such a scenario. This is illustrated below with respect to FIG. 1.

FIG. 1 shows a schematic illustrating one exemplary configuration for conducting and guiding individuals safely in accordance with the various embodiments. In particular, FIG. 1 shows a hotel room 100 configured in accordance with the various embodiments. As in a conventional hotel room, room 100 includes a living area 101 with a bed 102, end tables 104a, 104b, and other items 106a, 106b, 106c, such as dressers, desks, chairs, heating/cooling units, tables, and lamps, to name a few. As shown in FIG. 1, room 100 also includes a restroom 108, a hallway 109, an exit 110, and a closet 112.

In the exemplary configuration of FIG. 1, room 100 can be configured to safely conduct and guide an individual from the bed 102 to the restroom 108 and back without the need for the individual to activate additional lighting that might disrupt the sleep of the individual or others in the room 100. In particular, room 100 is configured such that upon detecting an individual rising in the middle of the night, at least part of the path between the bed 102 and the restroom 108 (designated by arrows 120) is illuminated sufficiently to conduct and guide the individual between these locations.

In some embodiments, this can be accomplished as follows. Data collection devices (not shown), such as motion sensors, can be positioned in one or more locations in room 100. For example, motion sensors can be incorporated into end tables 104a, 104b, the frame of bed 102, or a nearby wall to monitor the areas adjacent to bed 102 where an individual is likely to place his feet (such as areas 122). However, such data collection devices can be positioned elsewhere in room 100. Thus, a signal can be generated by the data collection devices upon detection of the individual in these areas. Thereafter, based on the signal from such devices, guidance devices (not shown) can be activated. For example, floor lighting can be provided to illuminate at least one of areas 122 without significantly illuminating the rest of room 100. The amount of illumination from such guidance devices can be configured so not to be disruptive to sleep of the individual or others in the room. Such guidance devices can also be incorporated into end tables 104a, 104b, the frame of bed 102, or a nearby wall to illuminate areas 122. However, as with the data collection devices, the guidance devices can also be positioned elsewhere in room 100.

In addition to illuminating areas 122, the signal from data collection devices can also be used to illuminate the target location, i.e., area 124 in bathroom 108. While the signal can be used to activate the main lighting in bathroom 108, the present disclosure also contemplates that low-level lighting, such as that for area 122 can be used for area 124 so as not to be disruptive to the sleep of the individual or others in the room.

In some configurations, additional areas can be illuminated. For example, as shown in FIG. 1, area 126, 128, and 130 can also be illuminated to better guide the individual. Further, in some configurations, the illumination can be configured to provide more active guidance. For example, the illumination can be in the shape of an arrow or other shape for guiding an individual in a particular direction.

Deactivation of the illumination of areas 122-130 can occur in a variety of ways. In some configurations, a timer mechanism can be provided so that the illumination is deactivated after a period of time has elapsed. In another configuration, data collection devices (e.g., motion sensors) can also be placed in the target location (i.e., restroom 108) and the deactivation of the areas 122-130 can be delayed until motion is no longer detected in either area.

In some configurations, the illumination of areas 122-130 can be controlled based on time of day or light levels in room 100. In the case of the former, certain times of day can be associated with illumination. Accordingly, the data collection devices and guidance devices can be deactivated during such periods of time. In the case of the latter, one or more photosensors (not shown) can be provided in room 100 in one or more locations. Thus, if light levels in room 100 exceed a certain level, the data collection devices and guidance devices can be deactivated since they are not necessary.

The configuration of FIG. 1 can also be used to provide "on-demand" lighting in other types of structures. For example, in the case of warehouses or other large structures, it may not be efficient to provide lighting of the entire interior of the structure if an individual is only attempting to reach a certain location in the structure. In such configurations, an individual may wish to simply specify a destination and the lighting can be limited to the path required for the user to reach the target location. In such a configuration, the illumination can be maintained for as long as the user is detected in one of the starting or ending location or somewhere along the path therebetween. Further, a control system, such as a computing device, can be provided to allow the user to select the location desired and to control the illumination accordingly.

Figure 2:
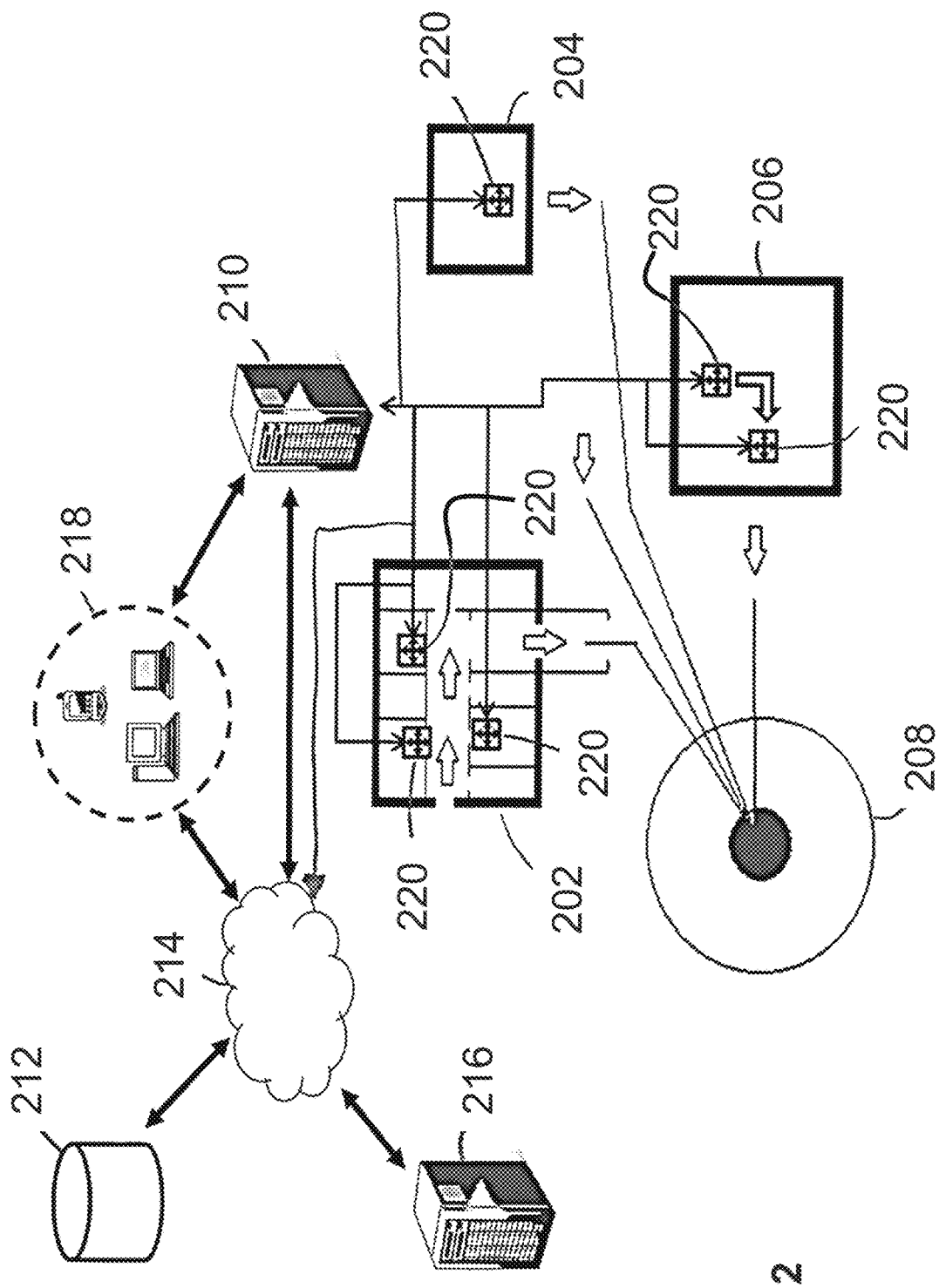
FIG. 2 shows a schematic illustrating an exemplary system for conducting and guiding individuals safely in accordance with the various embodiments.

The configuration of FIG. 1 illustrates a simple application of the principles of the invention. However, the various embodiments can also be used in more complex applications, as shown in FIG. 2. FIG. 2 shows a schematic illustrating an exemplary system 200 for conducting and guiding individuals safely from a structure in accordance with the various embodiments.

As shown in FIG. 2, system 200 operates with one or more structures 202, 204, and 206. Although structures 202, 204, 206 are shown as separate structures, structures 202, 204, and 206 can also be different levels of a single structure, such as in a multi-story or multi-level structure. The goal of system 200 is to direct individuals in structures 202-206 to a safe area 208. To achieve this goal, system 200 can include multiple guidance devices 220 positioned at one or more points throughout structures 202-206.

An exemplary configuration for guidance devices 220 is shown in FIGS. 3A, 3B, and 3C. FIGS. 3A, 3B, and 3C show various views of a guidance device in accordance with the various embodiments. In particular, FIGS. 3A, 3B, and 3C show side cross-section, front, and top views of a guidance device 220 in accordance with the various embodiments. In FIGS. 3A-3C, the guidance device 220 is illustrated in a flush, wall-mounted configuration. Thus, guidance device 220 can include features for mounting on a wall, such as holes or opening for bolts, screws, or any other types of fasteners. Although guidance device 220 is shown in a flush, wall-mounted configuration, the various embodiments are not limited in this regard. That is, the guidance device 220 can be configured for, corner mounting, as illustrated in FIG. 3D. Alternatively, the guidance device 220 can be configured for hanging from a ceiling or mounting on the tip of a pole, tripod, or other vertical support structure. Tor purposes of emergency lighting, it may be desirable to mount the guidance device 220 at waist height or lower. However, the various embodiments are not limited in this regard and the guidance device 220 can be mounted at any height.

As shown in FIGS. 3A, 3B, and 3C, a guidance device can include display areas 302. The display areas can be configured to include portions 304 for displaying directional information to individuals. As shown in FIGS. 3A-3C, the portions 304 can display the directional information in the form of arrows. In some configurations, the portions 304 can be dedicated elements for a particular direction (up, down, left, right). In other configurations, the portions 304 may be generated by a reconfigurable display 305, such as an LCD display or the like. Display areas 302 can also include, as shown in FIG. 3B, portions 306 for displaying written information. In some configurations, portions 306 can be a part of display 305 or operate separately. As shown in FIGS. 3A-3C, the configuration of each of display area 302 can be different. That is, some of areas 302 can display directional and written information and others of areas 302 can display solely directional information.

In addition to display areas 302, the guidance device 220 can also include one or more illumination sources 308 to illuminate an area in proximity of the guidance device. In particular, the guidance device 220 in FIGS. 3A-3C is configured to illuminate an area beneath the guidance device 220. However, in other embodiments, illumination in other directions can be provided by providing illumination sources 308 along other surfaces of the guidance device 220. Additionally, the illumination sources 308 can also be configured to illuminate in a fashion that provides directional information. For example, the illumination sources 308 can be configured to illuminate and area in a specific shape, such as an arrow. In another example, the illumination can be provided using colors to direct persons towards or away a guidance device 220. That is, a red illumination can be provided to direct persons away from a location and a green illumination can be provided to direct persons towards a location. Similarly, the sides of guidance device can be illuminated to indicate similar information. That is one side can be illuminated green and the other illuminated red. As a result, an individual approaching the guidance device from the wrong direction will see the red illumination, which signals the individual to turn around and head in a direction away from the guidance device 220. In contrast, an individual approaching the guidance device from the correct direction will see the green illumination, which signals the individual to continue toward the guidance device 220.

In guidance device 220, components 304, 305, 306, and 308 can be controlled via an on-board computing device or controller 312. The controller 312 can be configured to communicate with other devices, including other guidance devices, via wired or wireless communications links. The controller 312 and the other components can be powered via a battery 310. However, the various embodiments are not limited in this regard. In some configurations, power can be provided via an external power source, such as electrical wires. Moreover, such sources can also be used to continuously charge battery 310 to ensure that guidance device 220 can operate even in the absence of an external power source. Additionally, in some configurations, the guidance device 220 can be configured for direct wiring into the electrical system of the structure. Alternatively, the guidance device 220 can be configured to be "portable" in the sense that it can simply be plugged into an existing electrical outlet. In such a configuration, the guidance device 220 can include an electric cord to extend from a location of the guidance device 220 to the outlet. Alternatively, the guidance device 220 can include electrical prongs extending therefrom to as to plug in and mount the guidance device 220 simultaneously.

In some configurations, the guidance device 220 can also include one or more data detection devices, such as sensors 314 and 316 in FIGS. 3B and 3D, respectively. Examples of the types of detection devices include audio monitoring devices, image monitoring devices (still and video, including any optical, light, imaging, or photon sensors), motion or proximity detection devices, an environment monitoring devices (e.g., temperature, humidity), smoke or carbon dioxide detection devices, biological hazard detection devices, a chemical hazard detection devices, and a radiological hazard detection devices, to name a few.

In still other configurations, the guidance device 220 can include a speaker (not shown) for delivering information to individuals audibly. The speaker can operate as an alarm, but can also operate as a means of delivering information to individuals.

In operation, the guidance device 220 can operate in various ways. In one configuration, the guidance device 220 can operate autonomously. That is, based on signals from sensors 314 and 316, the controller 312 can determine how to operate components 304, 305, 306, and 308 and other components therein. In another configuration, the guidance device can be externally controlled by an external controller. That is, the controller 312 can receive signals, over a communications link, which instructs the controller on how to operate components 304, 305, 306, and 308 and other components therein. In such a configuration, the communications link can also be used to communicate signals from sensors 314 and 316 to the external controller. In still another configuration, the guidance device can operate semi-autonomously. That is, the controller 312 can c operate components 304, 305, 306, and 308 based on a combination of signals from an external controller and signals from sensor devices 314 and 316. The present disclosure contemplates that not all of components within a guidance device 220 would be activated during each event. For example, in the event that illumination is not an issue, the illumination sources 308 might not be activated.

Referring back to FIG. 2, the operation of the guidance devices 220 within system 200 will be described in greater detail. In operation, guidance devices 220 can initially be in a standby mode. That is, the guidance devices 220 are not configured to provide any particular instructions to users. In some cases, the guidance devices 220 can be configured to provide general messages or information. The placement of the guidance devices 220 in a standby mode can be accomplished via one or more signals from an external controller, such as local controller 210.

During standby operation, the local controller 210 can monitor information indicating the status of one or more parts of the structures 202, 204, 206. The information can be obtained from various sources. For example, as described above, sensors in guidance devices 220 can provide such information. In another example, standalone sensor devices can also be placed throughout structures 202, 204, 206 and place in communication with local controller 210. In yet another example, information can be provided from external sources. For example, a data server 212 can be provided over network 214. The local controller 210 can then communicate with data server 212 and obtain any pertinent information. In still another example, information can be received from user computing device 218, either located within structure 202, 204, 206 or externally and accessed via network 214.

Based on the information the local controller 210 receives, the local controller 210 can determine the occurrence of a triggering event and an appropriate configuration for the guidance devices 220. For example, in the case of a fire, in one portion of the structures 202, 204, 206, the local controller can determine that individuals should be directed outside via particular routes to avoid the fire and/or emergency response personnel. A similar set of actions can take place in the event of other hazards. Similarly, in the event of a medical emergency, it may be useful to direct individuals away from a portion of structures associated with the event and out of the way of emergency response personnel. In some embodiments, the local controller 210 can also receive a signal when emergency response personnel are ready to leave an location associated with a trigger event (e.g., medical personnel ready to transport a victim to an ambulance). In response, the local controller 210 can configure the guidance devices 220 accordingly. In particular, the guidance devices 220 can be reconfigured to guide the emergency response personnel out of a structure as quickly as possible while guiding other persons in the structure to avoid getting in their way.

The local controller 210 can determine the occurrence of a triggering event in various ways. In some configurations, the local controller 210 can simply receive information that explicitly identifies the triggering event and the location thereof within structures 202, 204, and 206. Thereafter, based on the triggering event identified, the local controller 210 can signal the guidance devices 220 to configure them appropriately, according to the type of event and location thereof. In some cases, the information received can also specify the configuration for the guidance devices 220. For example, first responders can interact with the local control 210 to manage the evacuation of a structure in the event of an emergency by a specifying the configuration of the guidance devices.

In other configurations, the local controller 210 can include logic that determines the type of triggering event and location thereof based on the information received. For example, if signals are received from smoke detectors in a certain portion of structures 202, 204, 206, the local controller 210 can determine the occurrence of a fire in the certain portion. Thereafter, the local controller 210 can determine appropriate escape routes, based on the location of the fire, and configure the guidance devices 220 accordingly.

In some configurations, the local controller can determine the occurrence of a triggering event based on an analysis of data from sensors to identify potential hazards. For example, in the case of a gunman entering a building, image recognition techniques can be utilized to detect the presence of a weapon or a known criminal from video data. Similarly, gunshot sounds can be recognized from audio data. Recognition techniques can also be applied to other types of triggering events to recognize the occurrence of such.

Once a triggering event is detected, the local controller 210 can determine how to configure the guidance devices 220 in a variety of ways. In some configurations, the local controller 210 can be preprogrammed with routes for individuals based on particular types of triggering events, the location of such triggering events, and/or the locations of the individuals (i.e., the locations of the guidance devices 220). Thus, individuals in different locations within structure 202, 204, 206, may have different routes. In other configurations, the routes for the individuals can be determined dynamically. That is, the triggering event and location thereof can be determined, all possible routes identified thereafter, and finally a route can be selected based on some criteria. For example, considered criteria can include, but is not limited to, the degree of risk of a route, the expected time to traverse the route, other potential hazards within the structure along the route, number of persons a route can handle, or types of individuals in the structure (e.g., adults versus children).

It should be noted that in the various embodiments, the guidance devices 220 need not be limited to indicating conventional routes, such as emergency exits or stairwells. Rather, to safely get individuals out of harm's way, the local controller 210 can determine that atypical or unconventional routes can be more suitable. For example, guidance devices 220 can be configured to lead individuals to a window on a ground floor or other atypical exit from the structure. In another example, as shown in FIGS. 3A-3C, arrows can be provided to not only route individuals in a horizontal direction, but also to route individuals in a vertical direction. In such cases, the guidance devices 220 can also be configured to provide written information that indicates the atypical exit required of a guidance device 220 can be positioned next to the atypical exit to make clear the type of exit intended for the individual. Similarly, guidance devices 220 can be configured to route users along a longer, indirect path that is safer and avoids the hazard.

In some embodiments, the configuration of guidance devices can be selected based on the types of individuals. For example, in the case of children, the configuration of guidance devices 220 can be selected to be as simple as possible, such as including only arrows. In the case of adults or adolescents, additional information may be provided. Also, as noted above, the route indicated by the guidance devices 220 can reflect the types of individuals. Accordingly, the physical capabilities of the individuals can be considered. For example, in a structure with a large number of children, seniors, or disabled persons, the routes provided are those deemed to be safe from the triggering event and safe from potential injury based on limited physical ability.

Although FIG. 2 shows that a local controller 210 is in communication with and controlling guidance devices 220, the various embodiments are not limited in this regard. In some configurations, a redundant controller 216 can be provided locally or on a network 214, as illustrated in FIG. 2. The redundant controller 216 can be a "clone" of local controller 210 and can be configured to take over operation in the event that local controller 210 is unavailable or compromised. Accordingly, the guidance devices 220 can be configured to communicate with redundant controller 216 over network 214 using wired or wireless communications links. In these configurations, the operation of redundant controller 216 is essentially the same as that of local control 210.

In some configurations, the redundant controller 216 can also be used to enhance or supplement the capabilities of local controller 210. That is, local controller 210 can be used manage information associated with certain types of sensor signals or events and redundant controller 216 can then be used to manage other types of sensor signals or events. For example, as discussed above with respect to the gunman example, certain types of sensor signals can require extended analysis to determine whether or not an event is occurring. In such cases, the analysis can be off-loaded to the redundant controller 216. In contrast, in the case of smoke detection, the amount of analysis required is low. Accordingly, the local controller 210 can be used to manage such an event.

In some configurations, the operation of the various guidance devices 220 can be coordinated so as to provide additional information to individuals. For example, in the case where multiple guidance devices 220 are in view, the operation of each can be alternated to provide "animated" direction information.

Although the various embodiments have been discussed primarily with respect to the use of solely guidance devices 220, the present disclosure contemplates that other devices within structures 202, 204, and 206 can be utilized as well. For example, in some configurations, user computing devices 218, such as desktop computers, laptop computers, smartphones, tablets, and other network connected devices can be in communication with local controller 210. Accordingly, when a triggering event is detected, instructions can be transmitted to such devices. In some cases, the display of such devices can be configured similar to that of guidance devices 220. In other cases, the instructions may simply be a warning or an alert.

Similarly, the system 100 can leverage the existence of other devices, such as that in FIGS. 4A, 4B, and 4C. FIGS. 4A, 4B, and 4C show various views of a bifacial information panel 400 that could be used as guidance device in accordance with the various embodiments. In particular, FIGS. 4A and 4B show exterior and interior views of panel 400. FIG. 4C show a cross-section view of panel 400 mounted in separator 450, such as a door, wall, or window. The exterior portion of panel 400 can include, as shown in FIG. 4A, a display 402, one or more controls 404, and, optionally, one or more sensors 406, such as a camera or microphone. The interior portion of panel 400, as shown in FIG. 4B, can include a display 410, controls 412, and a microphone 414. In conventional operation, the controls 404 can be utilized, by way of example and not by way of limitation, to leave a note to be displayed in display 402, to unlock a door or other entryway associated with panel 400, to announce the presence of an individual to another individuals on the other side of the separator 450, to engage in a conversation with an individual on the other side of the separator 450.

In some embodiments, the panel 400 can also be in communications with nearby guiding devices, a controller for the guidance devices, or both. Accordingly, when an event occurs that results in nearby guiding devices being configured to provide routing information to individuals, the panel 400 can be configured to present, at display 402, the same information as nearby guidance devices or related routing information. Consequently, the panel 400 supplements the existing network of guidance devices. In cases where a large number of instances of panel 400 are provided, such as in a hotel, cruise ship, apartment, or other structure with a large numbers of entryways along a hallway, corridor, or passage, it may be able to reduce the number of guidance devices required.

As noted above, the operation of panels 400 can be coordinated in the same way as guidance devices described above. That is, individuals can be directed to certain routes based on their location or the type of event, or they can be alternatively activated to provide an "animation" effect. In certain embodiments, the presence of sensors 406 can be advantageous. In particular, the sensors 406 in panels 400 can also be utilized to supplement the information obtained from other information sources.

In some embodiments, the interior display 410 can also be used to supplement the guidance devices. That is, the display 410 can be configured by a controller or nearby guidance device to indicate to individuals whether or not it is safe to pass through an associated entryway. Alternatively, if can be used to provide instructions as to whether to shelter in place or exit via atypical means. For example, in the case of a hotel room, the instructions may indicate that individuals should exit out a window (if feasible) or at least retreat to a balcony of the hotel room. Additionally, in cases where isolation is critical, the controller or nearby guidance device can cause the locks on entryway associated with the panel 400 to be locked.

Figure 5A:
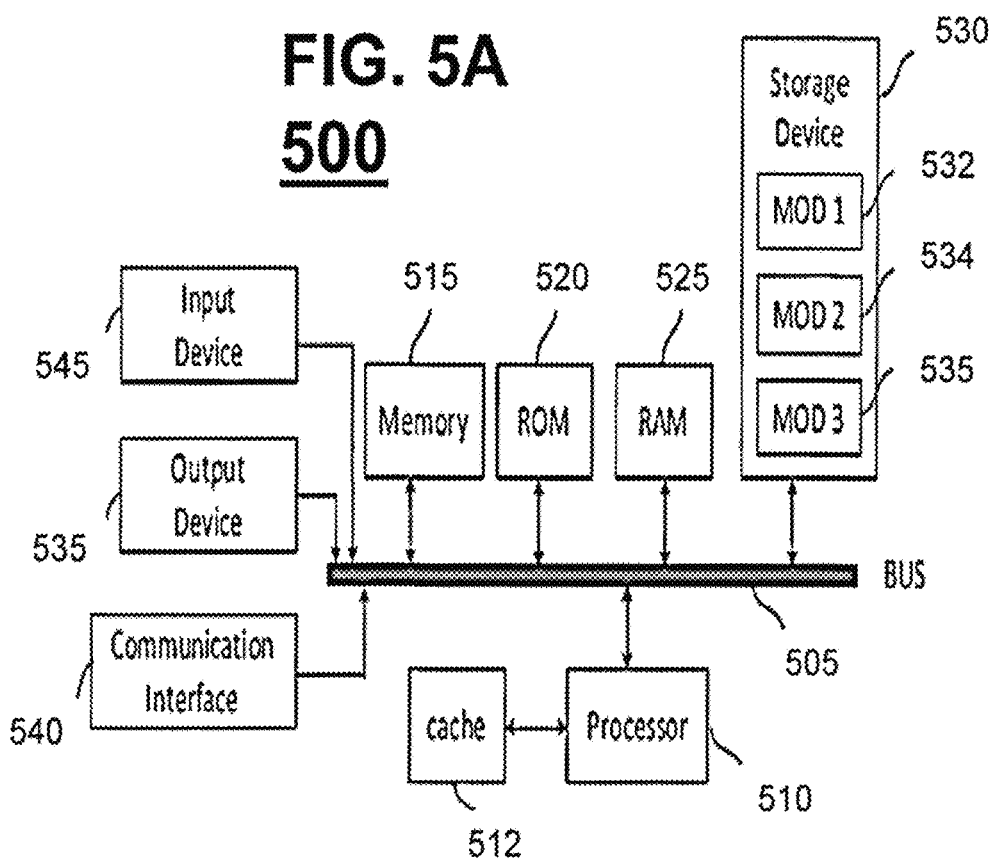
FIG. 5A, and FIG. 5B illustrate exemplary possible system configurations for computing devices for implementing or carrying out the various embodiments of the invention.
Figure 5B:
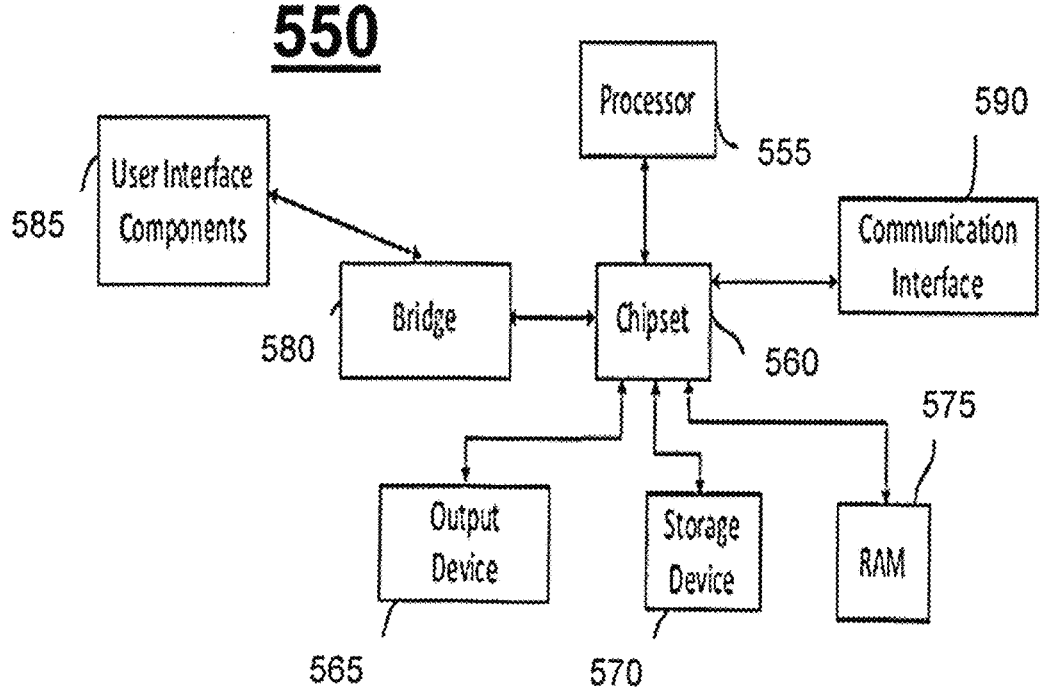

FIG. 5A, and FIG. 5B illustrate exemplary possible system configurations. The more appropriate configuration will be apparent to those of ordinary skill in the art when practicing the present technology. Persons of ordinary skill in the art will also readily appreciate that other system configurations are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some configurations the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

What is claimed is:

1. A method for guiding individuals through a structure, comprising:

using at least one data collection device to generate or collect data regarding conditions within said one or more portions of a structure, said at least one data collection device secured within said structure and configured to detect and record said conditions within said one or more portions of said structure on a continuous basis;

using a plurality of guidance devices positioned throughout the structure to provide real time visual, audio, or written commands to guide an individual to a particular direction within said structure based on information received from said at least one data collection device; and using a central control system having processing logic configured for performing operations stored on a non-transitory computer readable storage medium comprising:

receiving the collected data from the at least one data collection device, determining a current status of at least a portion of the structure based at least on the received data, and configuring at least a portion of the plurality of guidance devices to direct an individual through said structure, wherein the configuration for each of the portion of the plurality of guidance devices is selected based on the current status detected by said at least one data collection device.

2. The method for guiding individuals through a structure according to claim 1 wherein said plurality of guidance devices are providing real time visual, audio, or written commands to guide an individual to a particular direction within said structure based on information received from said at least one data collection device when an emergency event is triggered.

3. The method for guiding individuals through a structure according to claim 1 further including the steps of:
  receiving additional data from the at least one data collection device,
  updating a current status of at least a portion of the structure based at least on the additional data to yield an updated status, and
  updating a configuration of at least a portion of the plurality of guidance devices based on the updated status.

4. The method for guiding individuals through a structure according to claim 1, wherein the at least one data collection device comprises a sensor device.

5. The method for guiding individuals through a structure according to claim 4, wherein said sensor device comprises at least one of an audio monitoring device, a video monitoring device, a motion detection device, an environment monitoring device, a smoke detector device, a biological hazard detection device, a chemical hazard detection device, and a radiological hazard detection device.

6. The method for guiding individuals through a structure according to claim 1, wherein the at least one data collection device comprises at least one of an audio monitoring device and a video monitoring device for generating at least one of audio or video data as the collected data, and wherein the processing logic for determining the current status further comprises additional processing logic for audibly or visually recognizing an event or condition within the structure from the collected data.

7. The method for guiding individuals through a structure according to claim 1, wherein each of the plurality of guidance devices comprises at least one of a lighting device or an informational display device.

8. The method for guiding individuals through a structure according to claim 1, wherein said plurality of guidance devices positioned throughout the structure are displaying at least directional information to individuals, said directional information indicating at least a direction of egress.

9. The method for guiding individuals through a structure according to claim 1 further including operatively linking a smart phone or smart tablet device to said central control system, said plurality of guidance devices, or said at least one data collection device.

10. The method for guiding individuals through a structure according to claim 1 further including wireless communication components.

11. The method for guiding individuals through a structure according to claim 1 wherein said wireless communication components include a radio frequency identification (RFID) tag or reader.

12. The method for guiding individuals through a structure according to claim 1 further including using at least one data collection device to generate data regarding conditions outside of one or more portions of said structure, said at least one data collection device secured to said structure and configured to detect and record said conditions outside said one or more portions of said structure on a continuous basis.

13. The method for guiding individuals through a structure according to claim 1 wherein said real time visual, audio, or written commands to guide an individual to a particular direction within said structure based on information received from said at least one data collection device includes at least providing visual images, words, audio directions, or maps which directs an individual within said structure to move in one or more directions within said building to avoid an emergency event or other occurrence that requires said user to avoid a particular area of said structure.

14. The method for guiding individuals through a structure according to claim 1 wherein said real time visual, audio, or written commands to guide an individual to a particular direction within said structure based on information received from said at least one data collection device includes at least providing visual images, words, audio directions, or maps which indicate either a) safe passage within one or more portions of said structure, or b) unsafe passage within one or more portions of said building.

15. The method for guiding individuals through a structure according to claim 1 wherein information received from said at least one data collection device or said control system is communicated to a third party first responder.

16. The method for guiding individuals through a structure according to claim 1 wherein the at least one data collection device used to generate or collect data regarding conditions within said one or more portions of said structure is configured to recognize gunshots.

\* \* \* \* \*